United States Patent Office 3,764,350
Patented Oct. 9, 1973

3,764,350
PRINTING ON CELLULOSE FILMS
Harold R. Coleman, Danville, Ill., assignor to
Tee-Pak, Inc., Chicago, Ill.
No Drawing. Continuation-in-part of applications Ser. No. 697,592, Jan. 15, 1968, now Patent No. 3,539,361, and Ser. No. 44,556, June 8, 1970, now Patent No. 3,695,904. This application Aug. 24, 1970, Ser. No. 66,645
Int. Cl. A22c 13/00
U.S. Cl. 117—145
5 Claims

ABSTRACT OF THE DISCLOSURE

In the printing of clear, regenerated cellulose or fiber-reinforced regenerated cellulose sausage casings, improved adhesion of the ink to the casing and improved drying time for the imprint are obtained by preparing a cellulose casing from viscose by extrusion, coagulation, washing, and plasticizing, and then, while the casing is in the gel state and prior to drying thereof, applying to the gel casing in the area to be imprinted with printing ink a primer coating of an epoxy-substituted resin consisting of a water-soluble, thermosetting reaction product of an epihalohydrin and a poly secondary amine, said epoxy-substituted resin having an epoxy equivalent weight of at least about 100, thereafter drying the primed casing, and then imprinting the primer coated area of the dried casing with an oil-based ink or a flexographic ink.

RELATED APPLICATIONS

This application is a continuation-in-part application of copending application Ser. No. 697,592, now Pat. No. 3,539,361, filed Jan. 15, 1968, and copending application Ser. No. 44,556, filed June 8, 1970, now Pat. No. 3,695,904.

BACKGROUND OF THE INVENTION

This invention relates to a new and improved process for printing regenerated cellulose sausage casings and more particularly to a process in which a regenerated cellulose sausage casing is provided with a primer coating prior to imprinting with either an oil-base ink or a flexographic ink.

The printing of regenerated cellulose sausage casings has presented problems resulting from the manner of manufacture and the composition of such casings, and the method of use of the casings after printing. Regenerated cellulose sausage casings are normally manufactured by the viscose process. Viscose, of a suitable composition, is extruded through an annular die into a coagulating and regenerating bath to provide a hollow, thin-walled tube of coagulated and partially regenerated cellulose xanthate. The extruded tube is subsequently treated in an acid bath to thoroughly regenerate the cellulose, and is subsequently washed to remove by-products. The regenerated cellulose tube is eventually treated with an aqueous solution of glycerin and then dried and wound on reels. A type of casing known in the art as fibrous casing is manufactured by forming a long fiber hemp paper into a continuous tube, impregnating the tube with viscose, and treating the impregnated tube with a coagulating and regenerating bath to produce a paper-reinforced tube of regenerated cellulose. In the manufacture of fibrous casing, the reinforcing paper or web represents about 35–40% wt. of the casing and the regenerated cellulose and water and glycerin present as plasticizer constitute the balance of the casing. The fibrous casing is washed after the coagulation and regeneration baths and is finally subjected to treatment with an aqueous glycerin solution for plasticizing and, with or without an intermediate coloring treatment, e.g. naphthol dyeing, is finally dried and reeled. Both the clear regenerated cellulose casings and fibrous casings contain about 35–50 g. of glycerin plus water per 100 g. of regenerated cellulose or regenerated cellulose plus paper, in the case of the fibrous casing. The relatively high proportion of glycerin and water in the casing is required to keep the casing soft and pliable so that it is not cracked or torn easily during handling and further processing. The high water and glycerin content in clear cellulose and fibrous casings, both dyed and undyed, has made the printing of such casings somewhat dificult. Common printing inks, both of the oil base and flexographic types, either do not adhere well or have excessively long drying times when used for printing regenerated cellulose sausage casings.

In the handling of casings subsequent to printing, the casings are cut to size for delivery to the meat packer. The meat packer then ties one end of the casing and soaks the casing in water to make it more flexible prior to stuffing with sausage meat. The soaked casing is then stuffed with a sausage emulsion to produce a bologna or similar sausage, and the other end of the casing is then tied to complete the formation of the sausage stick. In the preparation of the sausage, the stuffing of the casing with sausage emulsion results in a stretching of the casing beyond its original dimensions. The printing on the casing is, therefore, subject to considerable abuse as a result of the presoaking of the casing and the stretching of the casing during stuffing, with the result that imprint may come off during further handling of the sausage. It has, therefore, been necessary to provide printing on sausage casing which will not rub off even after the casing has been soaked in boiling water for ten minutes. In fact, the resistance of the imprint to removal after soaking in boiling water for ten minutes is a relatively standard test for satisfactory printing of sausage casings.

In the past, two major printing techniques have been used for the printing of regenerated cellulose sheet material and attempts have been made to use these techniques in the printing of regenerated cellulose sausage casings. The techniques commonly used for the printing of regenerated cellulose sheet are flexographic printing and printing with oil-base printing inks.

The application of flexographic printing to the printing of regenerated cellulose sausage casing has been generally unsatisfactory as a result of the poor adhesion of the ink to the relatively moist surface of the sausage casing. Also, flexographic printing has not proved sufficiently adherent to sausage casings to withstand the abuse encountered in presoaking and stuffing of the casing.

Oil-base printing inks have been used with some success in the printing of regenerated cellulose sausage casings. The drying oil printing inks which have been used comprise a pigment or mixture of pigments, a vehicle drying by oxidation, and a drying agent or mixture of drying agents. Vehicles drying by oxidation consist mainly of a drying oil or mixture of drying oils, such as unsaturated animal or vegetable or synthetic oils which oxidize and polymerize when exposed to the air in a thin film, leading ultimately to a solid and tough but flexible film. The drying oil of the printing ink vehicle may be linseed oil, tung oil, perilla oil, oiticica oil, soybean oil, and synthetic drying oils of petroleum origin. Chemically modified drying oils such as dehydrated castor oil or drying animal oil modified to free it from objectionable odor are also used. In most cases, the drying oils used in printing inks are bodied oils.

Drying oil printing inks do present two problems in the printing of regenerated cellulose sausage casings. Firstly, the ink must dry to the touch rapidly so that it will not block when the printed pieces of casing are stacked one on another. Secondly, the printing ink which has been dried to the touch must dry entirely by forming a chemical and/or physical bond to the substrate, i.e. clear regenerated cellulose or fibrous casings. The solution of the first problem has been relatively easy since the speed of drying, i.e. the formation of a dry, nonblocking surface layer or film, can be controlled and/or accelerated by appropriate selection of drying agents such as the various metal naphthenates, which are well known in the printing art for improving the drying characteristics of oil-base printing inks. The attainment of adhesion of the ink to the substrate within a reasonable time after printing has been more difficult and has not had a satisfactory solution.

Attempts have been made to solve the problem of adhesion of oil-base inks to a regenerated cellulose substrate by controlled drying over a period of time. For example, a special process step consisting of a high temperature treatment in an approximately 55% R.H. atmosphere has been considered necessary if the printing ink was to adhere properly to a regenerated cellulose sausage casing. This treatment, which was necessary to produce sufficient adhesion of the imprint to the regenerated cellulose casing and resistance of the imprint to abrasion and boiling water, has had the disadvantage that it tends to embrittle and weaken the casing at the edges. The aftertreatment for improving adhesion of the imprint to a regenerated cellulose casing has also had the disadvantage of altering the shades of pigment used in the printing ink so that the finished print is not always uniform and does not always match the color required by the customer.

Other attempts have been made to overcome the problem of adhesion of printing inks to regenerated cellulose casings by incorporation of certain reactive materials in a printing ink composition to cause the ink to adhere chemically to the substrate. Adams U.S. Pat. 3,316,189 and Heiss et al. U.S. Pat. 3,245,810 disclose printing ink compositions wherein a reactive material is admixed with an oil-base printing ink to promote the adhesion of the ink to a regenerated cellulose sausage casing or similar cellulosic substrate. The compositions described in the patents have the disadvantage that there is some tendency of the reactive constituent to set up on storage, or to react with moisture absorbed from the atmosphere, or to polymerize with heat to cause the printing ink to gel or harden. These printing ink compositions, therefore, have somewhat uncertain pot lives and require extreme care in handling.

Another approach, exemplified by that disclosed in Canadian Pat. No. 679,775, which has been suggested in an attempt to improve the problem of printing ink adhesion to regenerated cellulose casings has involved the use of primers which are applied to the area to be imprinted. The use of primers heretofore suggested, however, has not been completely satisfactory since certain materials, e.g. film-forming materials, often unsatisfactorily alter the permeability or other desirable properties of the casing film; many primer materials, e.g. urea formaldehyde resins, require special, e.g. acid, curing catalysts; some e.g. methylated materials, do not provide casings which are suitable for use with materials having highly sensitive flavors such as cheeses; and most materials either themselves are not sufficiently adherent to the casing or, even if so, do not improve performance of the printing inks with total satisfaction.

The preparation of colored casings also has long presented problems. Films made of regenerated cellulose can be colored or dyed with dyes of the type used in the dyeing of cotton and rayon. It has not been practical, however, to use fabric or yarn dyeing techniques in the preparation of casings. Generally, it is not practical to provide dyeing tanks of a size sufficient to permit the soaking of casings in dyes for extended periods of time. The preparation of colored casings, particularly those with fast colors, has been accomplished as part of the general processing of the casing at the time of manufacture. In some instances, the coloring agent is injected directly into the liquid which is then extruded. In other instances, the coloring agent is added to the casing subsequent to extrusion in an in-line operation in series with the casing production.

In techniques employing direct injection of the coloring agent into the feed to the extrusion die, the coloring agent employed may be an inorganic pigment (e.g. titanium dioxide), organic pigment (e.g. beta-hydroxynaphthoic acid), or lakes (e.g. the calcium and magnesium lakes of coupled naphthols, such as Lake Red C). In some instances, the injected coloring material also may be a vat dye (e.g. vat indigo and Indanthrene Blue) which is subsequently converted to the colorless, soluble leuco (i.e. reduced) form for distribution throughout the casing by passage of the coagulated casing while in the gel (i.e. undried) state through a bath containing a solution of a reducing agent such as sodium bisulfate, with the dye then being insolubilized as described below, to distribute same throughout the casing.

When a casing is colored in a process which is in series with the production of the casing, the casing is moved at a relatively high rate of speed through the coloring agent bath and any subsequently required developing baths or zones, as compared to the speed of dyeing of fabrics and yarns, with the result that it has proved quite difficult to produce desired colors that do not vary substantially in different lots of casings.

Most attempts to color regenerated cellulose casings on a commercial scale have used vat dyes or naphthol dyes. In fact, some major manufacturers use vat dyes extensively in the coloring of such casings.

Using vat dyes in an in-line operation, the casing film, after being coagulated and, where necessary, washed to remove coagulation treatment impurities and while in the gel state, is passed through a wash tank containing an aqueous solution of the vat dye in the colorless, soluble leuco or vat form. From the vat dye bath, the casing then is continuously passed through a gaseous environment rich in oxygen or a bath containing an aqueous solution of an oxidizing agent such as sodium perborate or persulfate to convert the dye to its insoluble form. Vat dyes produce colors which are somewhat reproducible and which are relatively fast. There are disadvantages in the handling and application of vat dyes.

Naphthol dyes are especially useful for in-line dyeing of cellulose sausage casings and have been used in the production of colored casings in various colors ranging from reds and yellows through dark browns. Naphthol dyes are formed by the reaction of the sodium salt of a phenolic or enolic compound, called a naphthol, with an aryl diazonium compound which is called a fast color salt. Naphthols differ widely in substantivity, a measure of the degree of affinity which a naphthol has for a substrate.

In naphthol dyeing, as exemplified by the process disclosed in U.S. Pat. No. 3,383,443, the casing (either unreinforced or fibrous casing) is dyed by two-step naphthol dyeing by first being passed from the wash tank into an alkaline solution of a single naphthol. From the naphthol bath, the casing is continuously fed through an aqueous solution of a single fast color salt maintained at a temperature less than about 20° C. (preferably less than 15° C.) and buffered with a suitable acid-salt mixture (e.g. sodium acetate-acetic acid) to a pH of about 2.5–5.9. The casing has a residence time in the fast color salt ranging from about 2–300 sec., preferably about 3–20 sec.

The so-called permanent coloring of cellulose casing with non-substratum coloring agents such as naphthol dyes, vat dyes, lake dyes, and other similar dyes, pigments, and mixtures thereof, is subject to some varying degree of dye rub-off or crocking particularly upon rewetting prior to stuffing. The pigment articles of a non-substratum dye adhere by virtue of polar groups and similar surface-active forces to the casing. During the subsequent processing of the casing, loose coloring agent particles may rub off, particularly during stuffing of the wetted casing with meat emulsion or in the handling of the wet stuffed sausage. This is objectionable due to the discoloration of uniforms and hands of employees preparing sausages since the dye is difficult to clean from the operator's hands and uniform.

STATEMENT OF OBJECTS AND FEATURES

Accordingly, it is one object of this invention to provide an improved process of printing regenerated cellulose which results in improved adhesion and accelerated drying rate.

Another object of this invention is to provide an improved process of printing regenerated cellulose casings with improved ink adhesion and accelerated ink drying A further object of this invention is to provide a new and improved process for printing regenerated cellulose casings wherein the imprint will adhere tenaciously even after being soaked in boiling water for ten minutes.

An additional object of the present invention is to provide a new process wherein not only improved printing on regenerated cellulose is achieved but as a further advantage the crocking non-fastness of any non-substrative colorants in the casing also is reduced.

A feature of this invention is the provision of an improved process for printing regenerated cellulose wherein the cellulose article is primed with a reactive primer composition prior to printing.

Another feature of this invention is the provision of a new and improved process for printing regenerated cellulose sausage casings wherein the casing, while in the gel state, is provided with a primer coating of an epoxy-substituted poly secondary amine and the coated casing is dried and then imprinted with an oil-base ink or a flexographic ink.

An additional feature of this invention is the provision of a new process which not only can be employed to effect improvement in the printing performance of regenerated cellulose casings but which also advantageously is useful to render colored regenerated cellulose casings crocking resistant.

Other objects and features of this invention will become apparent from time to time throughout the specification and claims as hereinafter related.

SUMMARY OF THE INVENTION

In accordance with the invention, it has been discovered that regenerated cellulose sausage casings, both of the clear regenerated cellulose and fibrous types, can be printed either with oil-based or flexographic inks with improved adhesion and improved drying of the printing ink. This is accomplished by providing a regenerated cellulose casing from viscose by extrusion, coagulation, washing and plasticizing, and while the casing is in the gel state and prior to the drying thereof, applying to the casing, in the area to be ink imprinted, an aqueous solution of an epoxy-substituted resin consisting of a water-soluble, thermosetting reaction product of an epihalohydrin an a poly secondary amine, said epoxy-substituted resin having an epoxy equivalent weight of at least about 100, and then drying the coated casing to develop the primer coating, which is boiling water adherent itself, on the casing surfaces. After the primer coating is applied and the casing is dried, the primed casing is printed with the desired imprint applied in either an oil-base ink or a flexographic ink. In either case, there is a substantially improved adhesion between the ink and the casing, and there is a more rapid drying of the ink to produce a non-offsetting film in substantially less time. The primer coating is discontinuous and advantageously does not unsatisfactorily affect the desirable properties of the casing, e.g. permeability, flexibility, etc.

As an added bonus, in cases where the casing contains non-substantive colorants, the coating also renders the casing colorant cracking resistant.

DESCRIPTION OF THE PREFERRED EMBODIMENTS

In carrying out this invention, a clear regenerated cellulose sausage casing or a fibrous casing is produced by extrusion, coagulation, washing, and plasticizing and the resultant casing, while in the gel state, and prior to the drying thereof, is provided with a primer coating of a thermosetting, epoxy-substituted poly secondary amine resin in preparation for printing.

The epoxy-substituted poly secondary amine resins employed to provide primer coatings in accordance with the present invention are water-soluble, thermosetting, non-film-forming resinous reaction products of an epihalohydrin, e.g. epichlorohydrin, with polymers containing a plurality of —NH— groups and having an epoxide equivalent weight of at least about 100 and preferably less than about 2000 (as determined by reaction with mercaptoethanol in the procedure described in Bates TAPPI, 52, No. 6, 1969, p. 1163). Examples of such resinous materials include water-soluble, thermosetting, epihalohydrin-modified polyamines such as polyethylene polyamines having a molecular weight of at least about 500; polyamideamines, such as condensation products of polyalkylene polyamines, e.g. diethylene triamine and triethylene tetraamine, and aliphatic dicarboxylic acids, e.g. succinic acid and adipic; and polyureaamines, such as condensation products of the described polyalkylene polyamines and aliphatic diisocyanates, e.g. 4,4'-methylene bis(cyclohexyl isocyanate). The resinous primary materials must be water-soluble or at least dispersible in water. In general, the epoxy-substituted primer employed has a water-solubility of at least 5% at 25° C. As the formation of films in the primer coating step if present is specifically desired to be avoided, the epoxy-substituted primer materials employed in the present invention are further characterized by their ability to form aqueous solutions having relatively low viscosities at concentrations suitable for application. Usually, the viscosity of a 1% aqueous solution of a suitable resin should not exceed about 100 centipoises at 25° C.

The epoxy-substituted primer material preferred for use in the present method, by virtue of its stability, low viscosity, and curability at neutral pH's to non-film primer coatings displaying excellent printing and anti-crocking performance, is Kymene 557, a water-soluble, thermosetting epoxy-substituted polymer marketed by Hercules, Inc., which is the reaction product of epichlorohydrin and an adipic acid-diethylene triamine polyamine having an epoxide equivalent content of about 450–500 (as determined by reaction with mercaptoethanol in the procedure described in Bates TAPPI, 52, No. 6, 1969, p. 1163), a Kjeldahl nitrogen content of about 13% and a viscosity at a 10% concentration in water of about 30 centipoises at 25° C.

The epoxy-substituted resin is applied to the gel casing in an aqueous solution. In general, the pH of the coating solution may vary over a relatively wide range, e.g. from about 4 to about 10. A feature of the present invention, however, is that neutral or nearly neutral coating solutions, e.g. those having a pH in the range of from about 6 to about 8, suitably may be employed using the self-curing, epoxy-substituted poly secondary amine primer resins with the result being that the special curing conditions and/or auxiliary catalytic characteristics of most other primer materials may be eliminated.

The epoxy-substituted resin is applied to the casing at solution concentrations and in amounts which are insufficient to produce a thin film over the primed area yet sufficient to cause the adhesion of the ink to the regenerated cellulose surface when imprinted and air dried thereon. That satisfactory ink adhesion is obtained using non-film-forming amounts of the epoxy-substituted poly secondary amine resin primers of the instant invention is a special feature thereof, since this allows the desired printing results to be accomplished without unsatisfactorily altering other desirable properties, e.g. the permeability, of the base cellulose film. Generally, the concentration of epoxy-substituted resin employed is at least about 0.5% and ranges up to about 5% with somewhat higher levels being required to develop the desired primer coating for subsequent imprinting with flexographic inks than with oil-based inks. The coating solution may, and preferably does, also contain small amounts, e.g. ranging up to about 10% by weight, of the casing plasticizing agent, e.g. glycerol, to preclude leaching of the plasticizer from the casing in the primed areas.

After the primer is applied over the area of the cellulose casing to be printed, the casing is dried, the primer coating being thereby cured, and then subsequently is imprinted with a flexographic or an oil-base ink. The oil-base or flexographic ink is applied in one or more steps, usually with intermediate drying of the ink in the case of multicolor printing. The oil-base and flexographic inks applied to the primer coated cellulosic casing dry more rapidly to the touch and adhere more tenaciously to the casing through subsequent processing. Imprints made over the primed casing have superior adhesion to the casing and do not come off when soaked in boiling water for ten minutes or as a result of the stretching which occurs when the casing is stuffed.

In embodiments of the invention wherein a colored casing is treated, an unreinforced or fiber-reinforced cellulose casing is continuously manufactured, a coloring agent is deposited in or on the cellulose film, and the colored casing is then treated with the printing agent, as above described, to improve coloring agent particle crocking fastness and the adhesion of printing ink subsequently applied to the resultant primed casing.

The coloring agent may be deposited in and/or on the regenerated cellulose casing film in any one or a combination of techniques capable of effecting the desired casing film coloration at feasible processing speeds including those utilizing a direct injection of actual coloring agent into the extrusion die feed stream and those employing an introduction of a coloring agent precursor into the casing film via the extrusion die feed stream or a gel film treating tank followed by a development of the actual coloring agent in a subsequent gel film treating tank or other zone. Included among specific coloring agents and techniques for depositing them which can be employed in the method of the present invention are those described hereinabove. Actual coloring agents and deposition techniques preferred for use in particular embodiments of the present method vary depending, inter alia, upon the end use for which the colored casing is intended. In the case of casings which are designed to come into contact with foods, the coloring agents must meet applicable requirements. In the case of casings produced for use in the manufacture of sausages, for example, the more preferred coloring agents are the naphthol dyes exemplified by those disclosed in U.S. Pat. No. 3,383,443.

TESTING PROCEDURE

The dye rub-off (crocking resistance) of casings prepared in accordance with this invention are evaluated on an Atlas CM-1 Crockmeter (Atlas Electric Devices Company). The crockmeter squares are dampened with water and rubber across the treated casing for 50 revolutions on the maximum stroke. The squares are visually compared with an untreated casing as a control.

The ink adhesion of casings treated in accordance with this invention are evaluated by placing printed samples of the material in an 80° C. water bath for one hour. Cellophane tape is then applied to the print and removed quickly. The amount of ink adhering to the tape indicated the quality of the ink adhesion. A control is also used for comparison.

Having generally described the invention, the following examples are included for purposes of illustration so that the invention may be more readily understood and are in no way intended to limit the scope of the invention unless otherwise specifically indicated. All amounts are on a weight basis unless otherwise specified.

Example 1

A fibrous cellulose casing is continuously prepared and dyed a light yellow-red (known in the trade as Suntan), coated, heat-dried, imprinted and air-dried.

A fibrous cellulose casing is continuously prepared as described above by passing fibrous paper past a viscose extrusion die into a coagulating and regenerating bath. The casing is continuously prepared at a rate of 40 feet per minute and fed through various wash and dye baths. The casing is washed and subsequently plasticized with glycerin following the coagulating and regenerating baths, and if there is any tendency to carry excess acid from the coagulating-regenerating baths, the casing may be passed through a 1% solution of sodium hydroxide as a pre-mercerizing treatment.

The casing is fed through a naphthol solution at a rate of 40 feet per minute and has a residence time of 6 seconds in the solution. The naphthol solution contains 0.5–200 g. per liter of Naphthol AS–RL, 0.75–1.5 g. per liter of ethylenediaminetetraacetic acid (or other chelating agent), an anionic wetting agent, and sufficient sodium hydroxide to produce a 0.03–1.2 N solution. The naphthol solution is preferably agitated continuously by bubbling air therethrough.

The casing, impregnated with naphthol dye component, is then passed through a solution of a fast color salt at a speed of 40 feet per minute and residence time of about 12–14 seconds. The fast color salt solution comprises a substantial stoichiometric excess of a fast color salt in proportion to the naphthol in the casing. The solution contains preferably 12 g. per liter of Fast Red AL and is buffered with 2–20 g. per liter of acetic acid and 15–5 g. per liter of sodium acetate to produce a pH in the range from 2.5–5.9. This solution also contains a small amount of a dispersant (Diazopon SS 837), a chelating agent (e.g. ethylenediaminetetraacetic acid), and 15–20 g. per liter of sodium chloride to prevent bleeding out of naphthol into the solution. The fast color salt solution must be maintained at a temperature less than 20° C. and preferably about 10–15° C.

Next, the casing passes through a hot water wash and then a sodium sulfide-sodium polysulfide wash to remove various impurities. The casing is then plasticized, coated in accordance with this invention, heat-dried, imprinted and air-dried.

A satisfactory coating solution consists of 0.5% (by weight) Kymene 557 and 10% glycerol in an aqueous solution adjusted to a pH of about 7.5 with ammonium hydroxide. Kymene 557 is a trade name of Hercules Powder Company, Wilmington, Del., for the water-soluble, polymeric polyepoxide which is the reaction product of epichlorohydrin and a polyamide prepared by reacting adipic acid with diethylenetriamine. Kymene 557 is obtained as a pale amber liquid of 10% solids content, having a density of 1.026, a viscosity of 30 centipoises at 25° C. (Brookfield), a pH of 5.0, and a nitrogen content (Kjeldahl) of 12.8% (dry solids basis). The above aftertreatment solution is applied by dipping to several pieces of dyed fibrous casing (regenerated cellulose casing reinforced with a hemp fiber paper) as a thin layer, and dried.

A portion of the coated casing is evaluated for dye rub-off on the Atlas CM–1 Crockmeter as described above in the testing procedure. An uncoated, dyed, control casing is also evaluated at the same time. The coated casing is found to give a relatively minor amount of dye crocking. The untreated control exhibits substantial crocking under the conditions of the test.

Next, a first down oil-base ink is applied to the coated surface and allowed to dry. The ink used is Alden and Ott 5650 white first down ink which comprises a mixture of pigment, metallic drier (e.g. cobalt naphthenate), alkyd resin and a resin hardener (e.g. cellulose acetate butyrate) in a drying oil (e.g. linseed oil, tung oil, etc.). The first down ink imprint, upon drying (about 6 days) can be subjected to immersion in boiling water for 10 min. and can be stretched in the same manner as a stuffed sausage casing without the dye or ink imprint coming off. When fibrous casing is dyed without aftertreatment in accordance with this invention and then imprinted, dye rub-off is noticeable upon boiling in water, rubbing and stretching, and ink imprint removed in boiling water is essentially complete.

In other experiments, the casing aftertreated as described above is imprinted with a second down yellow oil base ink (Sleight-Hellmuth 5221) and also with a third down blue oil base printing ink (I.P.I. 93524). In each experiment, a nontreated fibrous casing is run as a control. In each case, the coated casing exhibits superior resistance to dye crocking and to ink imprint rub-off as compared to the untreated control.

Example 2

In this example, a Kymene coating is used to give improved ink adhesion upon printing to a clear, unreinforced, regenerated cellulose casing.

The clear, unreinforced, regenerated cellulose casing is prepared in a conventional manner and coated with a coating composition essentially identical to that used in Example 1 except that the Kymene content is increased from 0.5% to 2%.

Large diameter cellulosic meat casings (known in the trade as Miscellaneous casings) are prepared by extruding viscose through a die having an annular orifice into a regenerating and coagulating bath. The casing may be manufactured at speeds ranging from 15–45 feet per minute. The viscose is extruded into a coagulating and regenerating bath containing ammonium sulfate, sodium sulfate, and sulfuric acid. In some experiments, the coagulating and regenerating baths are separated, the coagulating bath being primarily salts and the regenerating bath primarily acid. The casing is washed to remove acids, salts, and by-products and may be passed through a dilute caustic premercerizer bath to neutralize any acid carry-over from the last wash.

The aftertreatment solution prepared above is applied to a clear, regenerated cellulose casing (Tee-Pak Miscellaneous casing) as a thin layer, and the coated casing is dried and imprinted with an oil-base printing ink, viz, Sleight-Hellmuth 5221 second down yellow. The second down ink imprint, pon drying (about 4 days), can be subjected to immersion in boiling water for 10 min. and can be stretched in the same manner as a stuffed sausage casing without the ink imprint coming off. When nonfibrous casing is imprinted without aftertreatment in accordance with this invention, ink imprint rub-off is noticeable upon boiling in water, rubbing and stretching.

Example 3

In this example, a Kymene primer composition is used in protecting clear, regenerated cellulose casing against crocking and to improve adhesion of flexographic inks to the treated casing.

A coating composition similar to that employed in Example 1 is prepared excepting that the Kymene concentration is 1.0%. The solution is used to coat a clear, unreinforced, regenerated cellulose casing substantially as described in Example 2.

Large diameter cellulosic meat casings (known in the trade as Miscellaneous casings) are prepared by extruding viscose through a die having an annular orifice into a regenerating and coagulating bath. The casing may be manufactured at speeds ranging from 15–45 feet per minute and, in some cases, as high as 75 feet per minute. The viscose is extruded into a coagulating and regenerating bath containing ammonium sulfate, sodium sulfate, and sulfuric acid. In some experiments, the coagulating and regenerating baths are separated, the coagulating bath being primarily salts and the regenerating bath primarily acids. The casing is washed to remove acids, salts, and by-products and may be passed through a dilute caustic premercerizer bath to neutralize any acid carry-over from the last wash.

Several pieces of the coated casing are printed in a flexographic printing press in separate runs using different types of conventional flexographic printing inks. Flexographic printing inks consist generally of a resin and pigment dissolved in an alcohol free ester or in methyl ethyl ketone. The printing inks used in these experiments are Flexo-Tuf (a polyamide base ink), Plio-Lox (an acrylic base ink), and ICI cellulose ink (a nitrocellulose base printing ink).

When the coated casings are imprinted with each of the above-mentioned flexographic printing inks, the imprint is allowed to air dry for about 5 minutes. A control is run for each ink (casing not coated). The differences in ink adhesion under the tests of Example 1 were noticeable. The coated casings exhibit improved ink adhesion as compared with the untreated controls from which ink removal is complete in boiling water.

Other embodiments which do not depart from the spirt and scope of the present invention, of course, will be apparent to those skilled in the art. Accordingly, it will be understood the present invention is to be limited only by the scope of the appended claims.

What is claimed is:

1. In the manufacture of regenerated cellulose sausage casings wherein the casing is coated while in the gel cellulose state and subsequently dried, the improvement which comprises coating the outside surface of the gel cellulose casing prior to drying with a non-film-forming aqueous solution of a water-soluble, thermosetting reaction product of an epihalohydrin and a poly secondary amine selected from the group consisting of polyamideamines and polyureamines, said epoxy-substituted resin having an epoxy equivalent weight of at least about 100, and thereafter drying the coated gel casing to cure said coating and provide on the ultimately produced dried regenerated celluose casing a water-insoluble, cross-linked non-film surface coating which is receptive to an oil-base or a flexographic ink and thereafter printing over said water insoluble surface coating with an oil-base or a flexographic ink.

2. A process in accordance with claim 1 in which said epoxy-substituted resin is the reaction product of epichlorohydrin and a polyamide formed by condensing a polyalkylene polyamine and a dicarboxylic aliphatic acid.

3. A process in accordance with claim 1 in which said epoxy-substituted resin is a water-soluble reaction product of epichlorohydrin and a polyamide prepared by reacting adipic acid with diethylenetriamine.

4. A process in accordance with claim 1 in which said gel cellulose casing contains a non-substantive coloring agent and said coating of said casing with said epoxy-substituted resin renderes said casing resistant to coloring agent crocking.

5. A regenerated cellulose sausage casing coated on the outside surface with an insoluble, non-film coating comprising an insoluble, heat-cured reaction product of a water-soluble, thermosetting reaction product of an epihalohydrin and a poly secondary amine selected from the group consisting of polyamideamines and polyureamines, said epoxy-substituted resin having an epoxy equivalent weight of at least about 100, and having said water insoluble surface coating printed over with an oil base or a flexographic ink.

References Cited
UNITED STATES PATENTS

| | | | |
|---|---|---|---|
| 2,033,836 | 3/1936 | Lantz | 117—145 X |
| 2,362,915 | 11/1945 | MacGregor | 117—145 X |
| 2,573,956 | 11/1951 | Daniel | 117—145 X |
| 2,610,927 | 9/1952 | Foulds | 117—145 X |
| 2,763,571 | 9/1956 | Wooding | 117—145 X |
| 2,866,710 | 12/1958 | Dowd | 99—176 |
| 2,980,554 | 4/1961 | Gentile | 117—145 X |
| 3,309,215 | 3/1967 | Brader | 117—145 X |
| 3,378,379 | 4/1968 | Shiner | 99—176 |
| 3,539,361 | 11/1970 | Coleman | 99—176 |

ROBERT HALPER, Primary Examiner

U.S. Cl. X.R.

117—145

UNITED STATES PATENT OFFICE
CERTIFICATE OF CORRECTION

Patent No. 3,764,350            Dated   10/9/73

Inventor(s)   Harold R. Coleman

It is certified that error appears in the above-identified patent and that said Letters Patent are hereby corrected as shown below:

Column 2, Line 12 "dificult" should be --difficult--.

Column 5, Line 18, insert --.-- after drying.

Column 6, Line 3, "cracking" should be --crocking--.

Column 6, Line 52, "polyamine" should be --polyamide--.

Column 9, Line 57, "pon" should be --upon--.

Column 10, Line 33, "spirt" should be --spirit--.

Column 10, Line 67, "renderes" should be --renders--.

Signed and sealed this 3rd day of June 1973.

(SEAL)
Attest:

RUTH C. MASON
Attesting Officer

C. MARSHALL DANN
Commissioner of Patents
and Trademarks